(12) United States Patent
Sine

(10) Patent No.: US 7,025,369 B1
(45) Date of Patent: Apr. 11, 2006

(54) FOOT PEG ASSEMBLY FOR A MOTORCYCLE

(76) Inventor: Mark S. Sine, 4139 Ray Rd., Grand Blanc, MI (US) 48439

( * ) Notice: Subject to any disclaimer, the term of this patent is extended or adjusted under 35 U.S.C. 154(b) by 8 days.

(21) Appl. No.: 10/794,262

(22) Filed: Mar. 8, 2004

(51) Int. Cl.
*B62H 1/08* (2006.01)
(52) U.S. Cl. .......................... 280/291; 296/75; 74/564; D12/114
(58) Field of Classification Search ................ 280/291, 280/288.4; 180/219, 90.6; 74/564; 296/75; D12/114, 125
See application file for complete search history.

(56) References Cited

U.S. PATENT DOCUMENTS

| | | | |
|---|---|---|---|
| 555,576 A | 3/1896 | Logan | |
| 2,317,412 A | 4/1943 | Shaffer | |
| 4,638,682 A * | 1/1987 | Michiyama | ................. 280/291 |
| 5,605,642 A | 2/1997 | Nece | |
| 6,161,859 A | 12/2000 | Cheng | |
| 6,406,046 B1 | 6/2002 | Harrell | |
| D485,790 S * | 1/2004 | Sprague | ..................... D12/114 |
| 2004/0221680 A1* | 11/2004 | Utzman et al. | ................ 74/564 |
| 2004/0222613 A1* | 11/2004 | Cramer | ..................... 280/291 |
| 2005/0012300 A1* | 1/2005 | Egan | ......................... 280/291 |

* cited by examiner

*Primary Examiner*—Lesley D. Morris
*Assistant Examiner*—Matthew Luby

(57) ABSTRACT

A foot peg assembly for a motorcycle includes an elongated foot rest that has an outer end and a inner end. A stirrup is attached to the foot rest and includes a pair of legs each having a first end and a second end. A base is attached to and extends between the first ends such that the legs extend in generally the same direction away from the base. Each of the second ends is attached to the foot rest such that each of the second ends is generally adjacent to one of the inner and outer ends. A coupler is attached to the foot rest. The coupler is adapted for removably securing the foot rest to the frame of the motorcycle.

7 Claims, 5 Drawing Sheets

FOOT PEG ASSEMBLY FOR A MOTORCYCLE

BACKGROUND OF THE INVENTION

1. Field of the Invention

The present invention relates to foot peg devices and more particularly pertains to a new foot peg device for providing a comfortable foot rest for a motorcycle driver that supports the foot and ankle of the rider.

2. Description of the Prior Art

The use of foot peg devices is known in the prior art. U.S. Pat. No. 555,576 describes a foot support device for vehicles that supports the entire bottom of a foot. Another type of foot peg device is U.S. Pat. No. 6,161,589 having a post that is attachable to a motorcycle and a convex gripping pad that is removably attachable to the post. Yet another such device is U.S. Pat. No. Des. 405,393 again showing a post having a plurality of gripping pads positioned thereon.

While these devices fulfill their respective, particular objectives and requirements, the need remains for a device that supports and grips the bottom of the foot and also supports the heel of the rider. This is particularly useful when the rider wishes to place their feet in front of the motorcycle seat. The heel support would aid in allowing the rider to retain their feet off of the ground without any leg strain.

SUMMARY OF THE INVENTION

The present invention meets the needs presented above by generally comprising an elongated foot rest that has an outer end and a inner end. A stirrup is attached to the foot rest and includes a pair of legs each having a first end and a second end. A base is attached to and extends between the first ends such that the legs extend in generally the same direction away from the base. Each of the second ends is attached to the foot rest such that each of the second ends is generally adjacent to one of the inner and outer ends. A coupler is attached to the foot rest. The coupler is adapted for removably securing the foot rest to the frame of the motorcycle.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
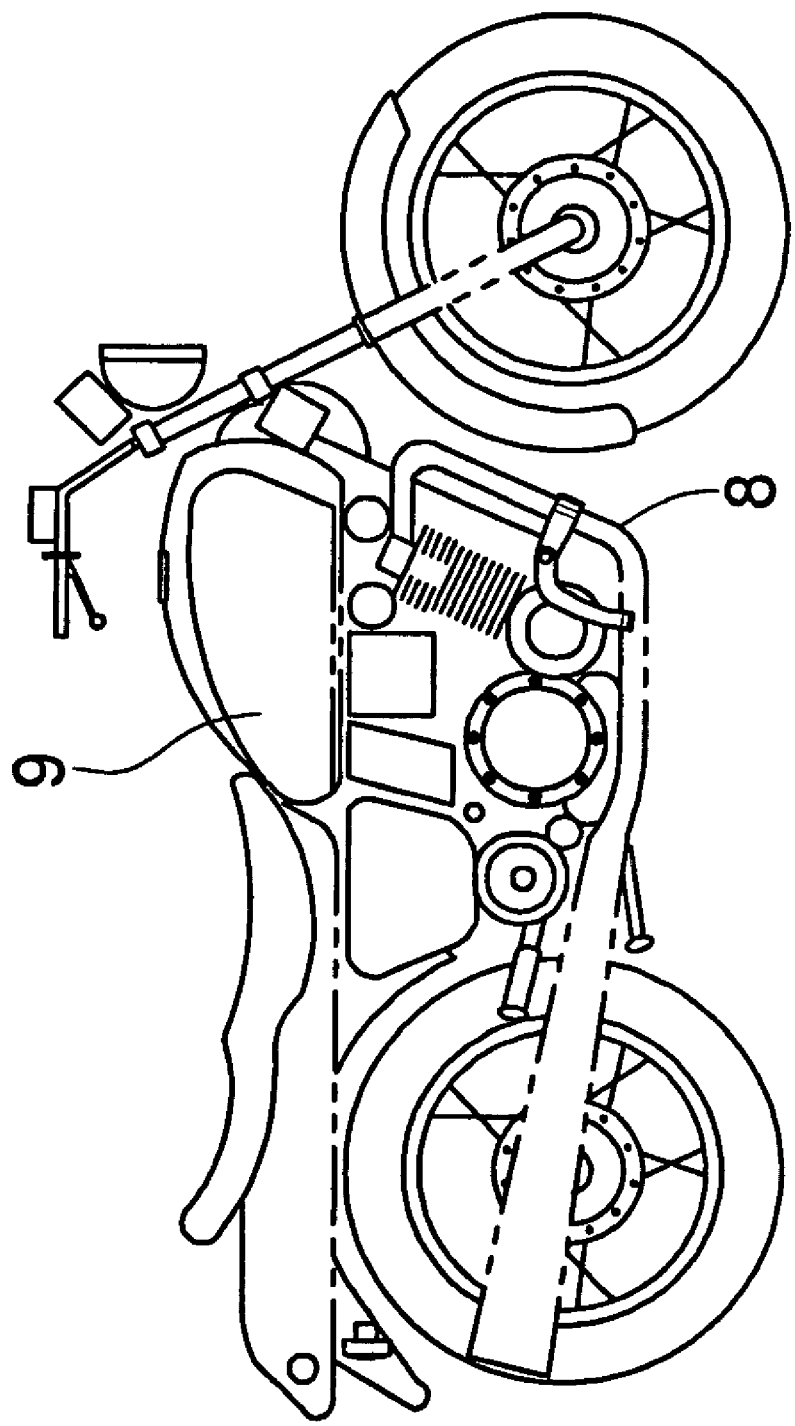
FIG. 1 is a side view of a foot peg assembly for a motorcycle according to the present invention.

With reference now to the drawings, and in particular to FIGS. 1 through 5 thereof, a new foot peg device embodying the principles and concepts of the present invention and generally designated by the reference numeral 10 will be described.

As best illustrated in FIGS. 1 through 5, the foot peg assembly 10 for a motorcycle generally comprises an elongated foot rest 12 having an outer end 14 and a inner end 16. A cross-section of the foot rest 12 taken perpendicular to a longitudinal axis of the foot rest is substantially circular shaped. A peripheral surface 18 extends between the inner 16 and outer ends 14. The peripheral surface 18 has a plurality of aligned channels 20 therein each extending around the foot rest 12. Convex arches 22 are positioned between each of the channels 20 such that gripping members are defined for feet positioned on the foot rest 12. The foot rest 12 may be comprised of either a metallic material or a substantially rigid elastomeric material.

A stirrup 24 is attached to the foot rest 12. The stirrup 24 includes a pair of legs 26 each having a first end 28 and a second end 30. A base 32 is attached to and extends between the first ends 28 such that the legs 26 extend in generally the same direction away from the base 32. Each of the second ends 30 is attached to the foot rest 12 such that each of the second ends 30 is generally adjacent to one of the inner 16 and outer 14 ends. The legs 26 each have a bend 34 therein such each of the legs 26 includes a first portion 36 adjacent to the foot rest 12 and a second portion 38 adjacent to the base 32. The first portions 36 are generally horizontally orientated and the second portions 38 are angled downwardly from a horizontal plane. Preferably, each of the bends 34 is generally between 45 degrees and 90 degrees, and more preferably between 50 degrees and 85 degrees. A juncture of each of the legs 26 and the base 32 is preferably rounded.

Figure 5:
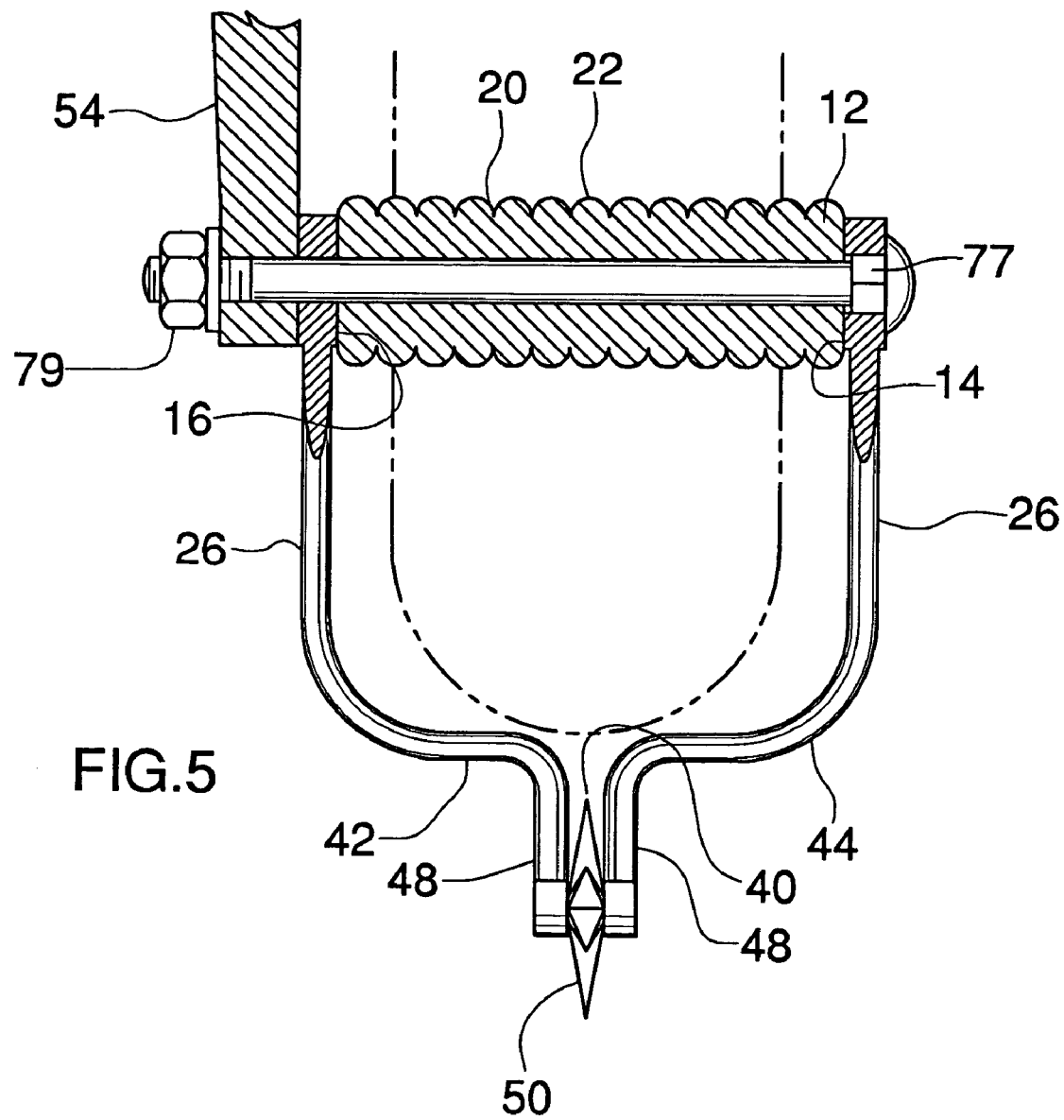
FIG. 5 is a cross-sectional view taken along line 5—5 of FIG. 4 of the present invention.

In a second embodiment shown in FIG. 5, the base 32 has a centrally located break 40 therein such that a first section 42 and a second section 44 of the base 32 is defined. Each of the first 42 and second 44 sections has a free end 46. Each of a pair of arms 48 is attached to and extends away from one of the free ends 46. The arms 48 are each orientated generally parallel to the second portions 38 of the legs 26. A rowel 50 is mounted to and between the arms 48 such that teeth extending outwardly from the rowel 50 are orientated generally perpendicular to the longitudinal axis of the foot rest 12. The rowel 50 may be rotatably or immovably coupled to the arms.

A coupler 52 is attached to the foot rest 12. The coupler 12 is adapted for removably securing the foot rest 12 to a frame 8 of a motorcycle 9. The coupler 52 includes a plate 54 that has a back edge 56, a forward edge 58, a first side edge 60 and a second side edge 62. The first side edge 60 is attached to the inner end 16 of the foot rest 12 such that the plate 54 extends away from the inner end 16 in a direction orientated generally parallel with the first portions 36 of the legs 26. The second end 30 of the leg 26 adjacent to the inner end 16 may be positioned between the inner end 16 and the plate 54. The forward edge 58 of the coupler 52 has a concave depression 64 therein adapted for receiving the frame 8 of the motorcycle 9. A bracket 66, preferably with a corresponding concave edge 68, is removably attachable to the forward edge 58 such that the plate 54 is secured to the frame 8 by securing a portion of the frame 8 between the bracket 66 and the plate 54.

A rod 70 may be extended through the foot rest 12 to secured the coupler 52 and the stirrup 24 to the foot rest 12. The rod 70 preferably has first end 72 that is threaded and a second end 74 having a head positioned thereon. A perimeter 77 of the rod 70 adjacent to the head is ideally rectangular shaped and is extended into a rectangular opening 78 in one of the legs 26 adjacent to the second end 30 of the leg 26. This prevents the stirrup 24 from rotating with respect to the foot rest 12. The rod 70 extends through the plate 54 so that the first end 72 of the rod 70 is exposed. A nut 79 may be secured on the first end 72 so that the plate 54, foot rest 12 and stirrup 24 are secured together.

Figure 2:
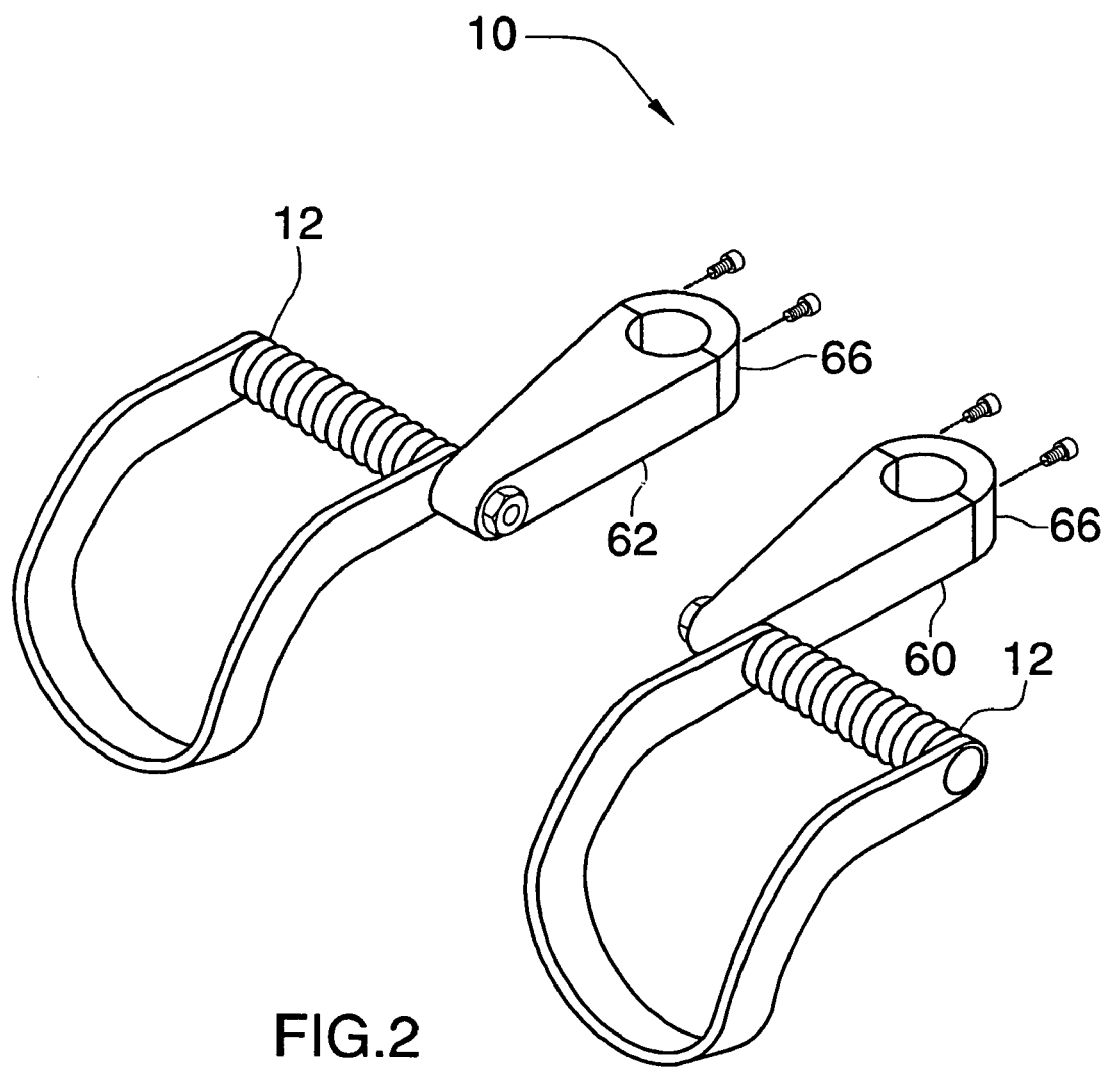
FIG. 2 is a perspective view of the present invention.
Figure 3:
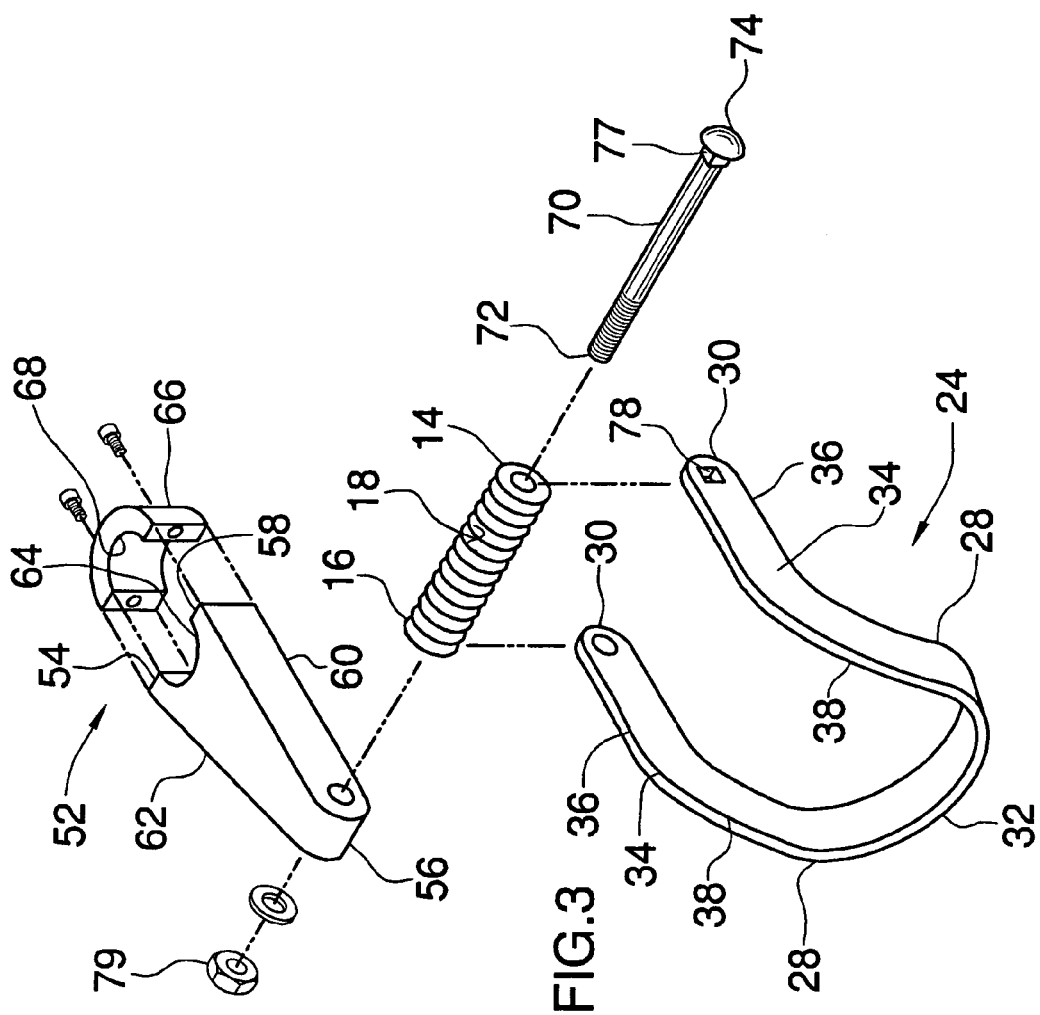
FIG. 3 is a perspective view of the present invention.
Figure 4:
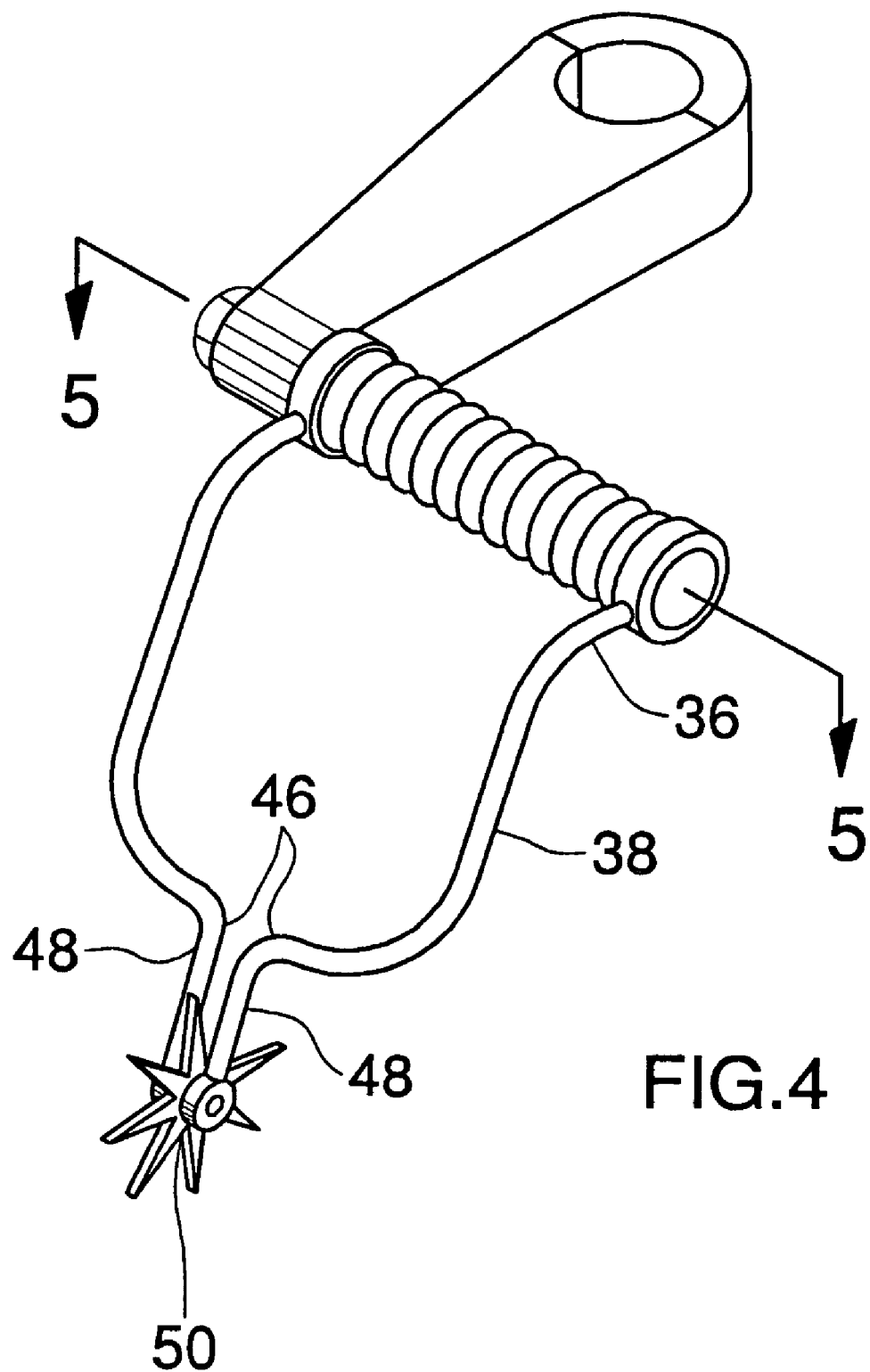
FIG. 4 is a perspective view of the second embodiment of the present invention.

In use, the foot rest 12 is used as a conventional foot rest 12 would be used on a motorcycle 9. The rider of the motorcycle, however, may rest their heel or Achilles heel on the base 32. The second embodiment includes the rowel 50 to give the impression that spurs are being worn by the rider of the motorcycle 9. It should be understood that two of the assemblies 10, which are mirror images of each other as shown in FIG. 2, would be positioned on the motorcycle 8 on opposite sides of the motorcycle 8.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A foot support assembly for removably positioning on a frame of a motorcycle, said assembly comprising:
   an elongated foot rest having an outer end and a inner end;
   a stirrup being attached to said foot rest, said stirrup including a pair of legs each having a first end and a second end, a base being attached to and extending between said first ends such that said legs extend in generally the same direction away from said base, each of said second ends being attached to said foot rest such that each of said second ends is generally adjacent to one of said inner and outer ends, each of said legs having a bend therein such each of said legs includes a first portion adjacent to said foot rest and a second portion adjacent to said base, said first portions being generally horizontally orientated and said second portions being angled downwardly from a horizontal plane; and
   a coupler being attached to said foot rest, said coupler being adapted for removably securing the foot rest to the frame of the motorcycle, said coupler including a plate having a back edge, a forward edge, a first side edge and a second side edge, said first side edge being attached to said inner end of said foot rest such that said plate extends away from said inner end in a direction orientated generally parallel with said first portions of said legs, said forward edge of said coupler having a concave depression therein adapted for receiving the frame of the motorcycle, a bracket being removably attachable to said forward edge such that said plate is secured to the frame.

2. The assembly according to claim 1, wherein a cross-section of said foot rest taken perpendicular to a longitudinal axis of said foot rest is substantially circular, a peripheral surface extending between said inner and outer ends having a plurality of aligned channels therein each extending around the foot rest, convex arches being positioned between each of said channels such that gripping members are defined.

3. The assembly according to claim 1, wherein each of said bends is generally between 45 degrees and 90 degrees.

4. The assembly according to claim 3, wherein a juncture of each of said legs and said base is rounded.

5. The assembly according to claim 3, wherein said base has a centrally located break therein such that a first section and a second section of said base is defined, each of said first and second sections having a free end, each of a pair of arms being attached to and extending away from one of said free ends, each of said arms being orientated generally parallel to said second portions of said legs, a rowel being mounted to and between said arms such that teeth extending outwardly from said rowel are orientated generally perpendicular to said longitudinal axis of said foot rest.

6. The assembly according to claim 1, wherein said base has a centrally located break therein such that a first section and a second section of said base is defined, each of said first and second sections having a free end, each of a pair of arms being attached to and extending away from one of said free ends, each of said arms being orientated generally parallel to said second portions of said legs, a rowel being mounted to and between said arms such that teeth extending outwardly from said rowel are orientated generally perpendicular to said longitudinal axis of said foot rest.

7. A foot support assembly for removably positioning on a frame of a motorcycle, said assembly comprising:
   an elongated foot rest having an outer end and a inner end, a cross-section of said foot rest taken perpendicular to a longitudinal axis of said foot rest being substantially circular, a peripheral surface extending between said inner and outer ends having a plurality of aligned channels therein each extending around the foot rest, convex arches being positioned between each of said channels such that gripping members are defined;
   a stirrup being attached to said foot rest, said stirrup including a pair of legs each having a first end and a second end, a base being attached to and extending between said first ends such that said legs extend in generally the same direction away from said base, each of said second ends being attached to said foot rest such that each of said second ends is generally adjacent to one of said inner and outer ends, each of said legs having a bend therein such each of said legs includes a first portion adjacent to said foot rest and a second portion adjacent to said base, said first portions being generally horizontally orientated and said second portions being angled downwardly from a horizontal plane, each of said bends being generally between 45 degrees and 90 degrees, a juncture of each of said legs and said base being rounded, said base having a centrally located break therein such that a first section and a second section of said base is defined, each of said first and second sections having a free end, each of a pair of arms being attached to and extending away from one of said free ends, each of said arms being orientated generally parallel to said second portions of said legs, a rowel being mounted to and between said arms such that teeth extending outwardly from said rowel are orientated generally perpendicular to said longitudinal axis of said foot rest; and a coupler being attached to said foot rest, said coupler being adapted for removably securing the foot rest to the motorcycle, said coupler including a plate having a back edge, a forward edge, a first side edge and a second side edge, said first side edge being attached to said inner end of said foot rest such that said plate extends away from said inner end in a direction orientated generally parallel with said first portions of said legs, said forward edge of said coupler having a concave depression therein adapted for receiving the frame of the motorcycle, a bracket being removably attachable to said forward edge such that said plate is secured to the frame.

* * * * *